May 17, 1927.
E. W. ARMS
1,629,373
MICROSCOPE ATTACHMENT FOR SURVEYING INSTRUMENTS
Filed Oct. 20, 1925
2 Sheets-Sheet 1
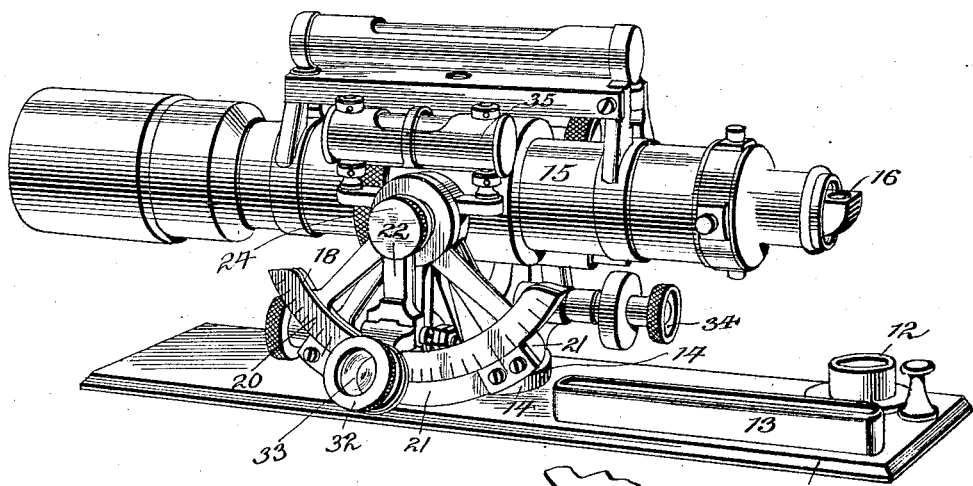
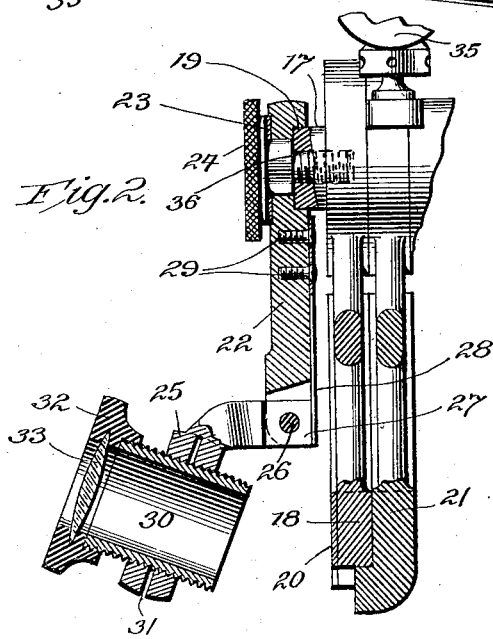
Inventor
Edward W. Arms
Attorneys May 17, 1927.
E. W. ARMS
1,629,373
MICROSCOPE ATTACHMENT FOR SURVEYING INSTRUMENTS
Filed Oct. 20, 1925    2 Sheets-Sheet 2
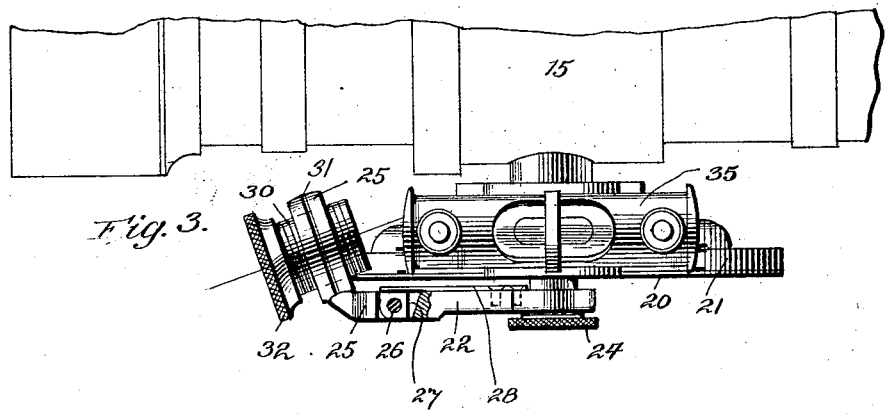
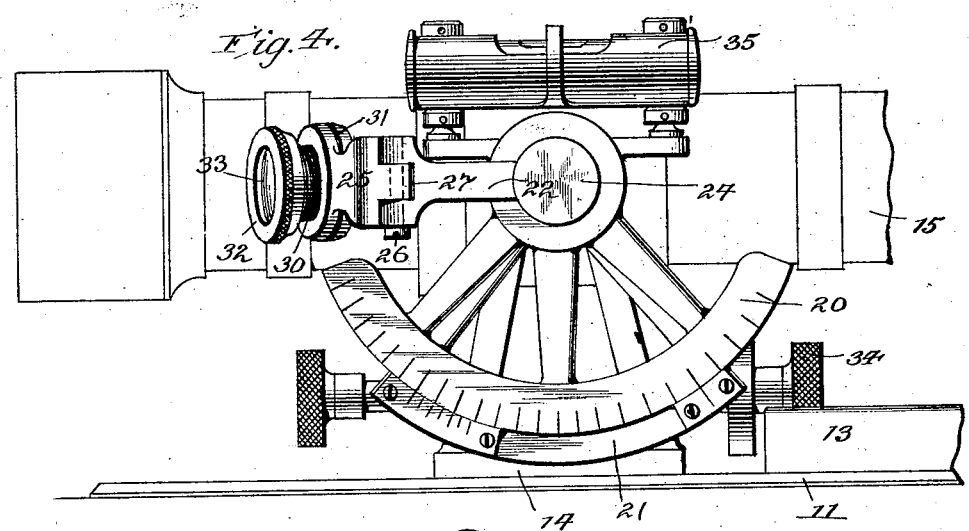
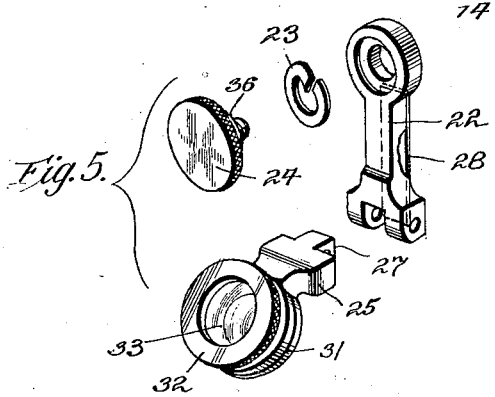
Inventor
Edward W. Arms
by Dodge and Sons
Attorney Patented May 17, 1927.

1,629,373

UNITED STATES PATENT OFFICE.

EDWARD W. ARMS, OF TROY, NEW YORK, ASSIGNOR TO W. & L. E. GURLEY, OF TROY, NEW YORK, A CORPORATION OF NEW YORK.

MICROSCOPE ATTACHMENT FOR SURVEYING INSTRUMENTS.

Application filed October 20, 1925. Serial No. 63,751.

This invention relates to surveying instruments and particularly to an attached microscope for use in reading the graduations on the arcs commonly used in transits, alidades and like instruments, particularly those used to measure vertical angles.

It has heretofore been proposed to attach microscopes to such instruments for similar purposes, but so far as I am aware no prior device fully meets the requirements. Briefly stated, the invention provides a supporting arm for the microscope which allows the microscope to be swung over the graduated arc to any desired position, and which supports the microscope always at the correct angle for reading the graduations without errors caused by parallax. The microscope is so mounted that it may be focused and the focus, when once satisfactorily adjusted need not be disturbed. The support is so contrived that when the microscope is not needed the arm may be swung beyond the end of the arc and the microscope may then be tipped into the plane of the arc, thus materially reducing the over-all dimensions of the instrument and permitting the use of a more compact carrying case.

The invention is shown applied to an alidade in the accompanying drawings, in which Fig. 1 is a perspective view of an alidade showing the microscope applied. In this view the microscope is in position for use;

Fig. 2 is a fragmentary vertical section on the axis of the trunnions of the telescope, showing the microscope in position for use;

Fig. 3 is a fragmentary plan view showing the microscope folded to its inoperative position preparatory to packing the instrument;

Fig. 4 is a fragmentary side elevation showing the parts in the position of Fig. 3;

Fig. 5 is a perspective view showing the component parts of the microscope and support partially disassembled.

The ruler is indicated at 11 and this, as usual, carries a circular spirit level 12 and a trough compass 13. Mounted on the ruler 11 is a frame or pedestal 14 and mounted in trunnions on the pedestal 14 is the usual telescope 15 whose eye-piece is shown at 16. The details of the telescope and its mounting need not differ from standard practise and hence will not be described.

One of the axes or trunnions on which the telescope is mounted is shown at 17 in Fig. 2. It carries fixed to it a movable arc 18 and has a portion 19 projecting beyond this arc (Fig. 2). The arc 18 carries the usual graduations indicated in the drawings, and these coact with the index graduations on the plates 20 which are supported on the vernier arm 21. The vernier arm 21 swings on the axis or trunnion 17 and may be adjusted by a tangent screw 34. Such adjustment is made by reference to a control level 35 on vernier arm 21.

The microscope structure forming the subject of the present invention, and now about to be described, is for the purpose of reading accurately the graduations on the arc 18. Swiveled on the projecting end 19 of the trunnion or axis 17 is an arm 22. This is recessed on both faces, as clearly indicated in Figs. 2 and 5. The rear recess receives the projecting part 19 of the trunnion and the front recess offers a seat for the spring washer 23. The arm 22 is retained on the trunnion 17 and the spring washer 23 is stressed to the extent desired by a knurled screw 24. This is threaded in the end of the trunnion 17 and has a shoulder 36 which seats against the end of trunnion 17.

An off-set yoke 25 is hinged to the outer forked end of the arm 22 by means of a pin 26. The yoke is formed adjacent the pin 26 with a sharp heel or corner 27 which coacts with a leaf spring 28 to produce a knife hinge. The leaf spring 28 is held by screws 29. The parts are so constructed that the yoke 25 may be swung on the pivot 26 to either of two positions at approximately 90° from each other, the leaf spring 28 acting to retain the yoke impositively in either of these two positions. The yoke 25 is angularly offset as shown, so that in one position of the yoke the axis of the microscope tube 30 is properly directed toward the graduations on the arc 18.

The microscope tube 30 is externally threaded and is screwed into a threaded opening in the yoke 25. The yoke 25 is slotted transversely to this opening at 31 and slightly sprung so that a moderate frictional clamping action is exerted on the microscope tube 30. The tube 30 carries at one end the eye-piece 32 which also serves as the mount for the magnifying lens 33. The tube 30 may be rotated by means of the eye-piece to screw the tube through the yoke 25 and thus adjust the focus of the lens. As explained, the tube 30 is frictionally held against rotation so that the focus, once adjusted, will be maintained.

It will be observed that the arm 22 swings close to the plane of the front face of the arc 18 and that the arc 18 subtends an angle of approximately 120°. When it is not desired to use the microscope or when it is desired to pack the instrument, the arm 22 is swung up to the position shown in Figs. 3 and 4 so that it is above one end of the arc 18. The yoke 25 is then tilted inward on the pivot 26 toward the telescope. This brings the parts to the position best shown in Fig. 3 in which the microscope tube and eye-piece are wholly within the plane of the outer side of the screw 24 and overlying one end of the arc 18.

It will be observed that the microscope is adjustable for focus, that it swings in an arcuate path concentric with the arc 18, that it may be swung to any position relatively to the arc 18, and that when not in use it may be swung clear of the arc and the microscope may be tipped to a position in which it falls within the dimensional limits of the alidade proper.

The invention is applicable to a wide variety of instruments in substantially the manner above illustrated and described.

What is claimed is:

1. The combination of a geometrical instrument including a graduated arc; a microscope for reading the graduations on said arc; an arm pivoted to swing on an axis substantially concentric with said arc; a carrier member directly supporting said microscope; and a hinge connection between said carrier and arm arranged to permit said microscope to swing into the space at the end of said arc when not in use.

2. The combination of a geometrical instrument including a graduated arc; a microscope for reading the graduations on said arc; an arm pivoted to swing on an axis substantially concentric with said arc; a carrier member directly supporting said microscope; a hinge connection between said carrier and arm arranged to permit said microscope to swing into the space at the end of said arc when not in use; and an impositive detent associated with said hinge and arranged to retain said carrier member alternatively in the position last named and in its operative position for reading said graduations.

3. The combination of a geometrical instrument including a graduated arc; a microscope for reading the graduations on said arc; a threaded tubular mount for said microscope; an arm pivoted to swing on an axis substantially concentric with said arc; a threaded carrier member in which said threaded mount is adjustably sustained by its threads; and a knife hinge connection between said carrier and arm arranged in conjunction with the arm to sustain said carrier in two positions, in one of which the microscope is in its operative position over the face of the arc, and in the other of which is beyond and overlapping the end of the arc.

In testimony whereof I have signed my name to this specification.

EDWARD W. ARMS.